United States Patent
Watte et al.

(10) Patent No.: US 7,956,992 B2
(45) Date of Patent: Jun. 7, 2011

(54) OPTICAL CABLE TESTING

(75) Inventors: Jan Watte, Grimbergen (BE); Luc Swinnen, Hechtel-Eksel (BE); Jan VandenBroeck, Aarschot (BE); Daniel Francois Daems, 'S-Gravenwezel (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 282 days.

(21) Appl. No.: 12/224,237

(22) PCT Filed: Feb. 14, 2007

(86) PCT No.: PCT/GB2007/000530

§ 371 (c)(1),
(2), (4) Date: Aug. 21, 2008

(87) PCT Pub. No.: WO2007/096584

PCT Pub. Date: Aug. 30, 2007

(65) Prior Publication Data

US 2009/0115999 A1    May 7, 2009

(30) Foreign Application Priority Data

Feb. 22, 2006    (GB) .................................. 0603437.5

(51) Int. Cl.
*G01N 21/00*    (2006.01)
(52) U.S. Cl. ........................................ 356/73.1
(58) Field of Classification Search .......................... None
See application file for complete search history.

(56) References Cited

U.S. PATENT DOCUMENTS

| 5,452,071 A * | 9/1995 | Takeuchi ..................... 356/73.1 |
| 7,042,559 B1 | 5/2006 | Frigo et al. |
| 2002/0101577 A1 * | 8/2002 | Thwing et al. ............... 356/73.1 |

FOREIGN PATENT DOCUMENTS

| FR | 2 751 746 A1 | 1/1998 |
| WO | WO 97/48994 A | 12/1997 |
| WO | WO 2005/052661 A | 6/2005 |
| WO | WO 2005/052665 A | 6/2005 |
| WO | WO 2007/009113 A | 1/2007 |

OTHER PUBLICATIONS

Masaaki Kawase et al., "Optical Fiber Cable Technology for Subscriber Loops", IEICE Transactions on Communications, Communications Society, Tokyo, UP, vol. E75-B, No. 9, Sep. 1, 1992, pp. 825-831, XP000321317 ISSN: 0916-8516.

Search Report for International Application No. PCT/GB2007/000530 issued by the European Patent Office on Aug. 1, 2007.

* cited by examiner

*Primary Examiner* — Tu T Nguyen
(74) *Attorney, Agent, or Firm* — Baker & Daniels LLP

(57) ABSTRACT

A method is disclosed for testing optical fiber connection quality of an optical drop fiber between a telecommunications system and a subscriber connection box in a multi-dwelling unit or other subscriber premises before connection to other subscriber equipment. An end of the optical fiber to be tested is placed in a fiber-holding device, which holds the fiber end in alignment with a suitable reflective body. An optical signal is provided from the system direction which is reflected by the reflective body back towards the system. The reflected signal is detected by a suitable instrument, preferably an optical time domain reflectometer (OTDR), to confirm acceptable signaling quality of the optical path between the system and the fiber end.

11 Claims, 3 Drawing Sheets

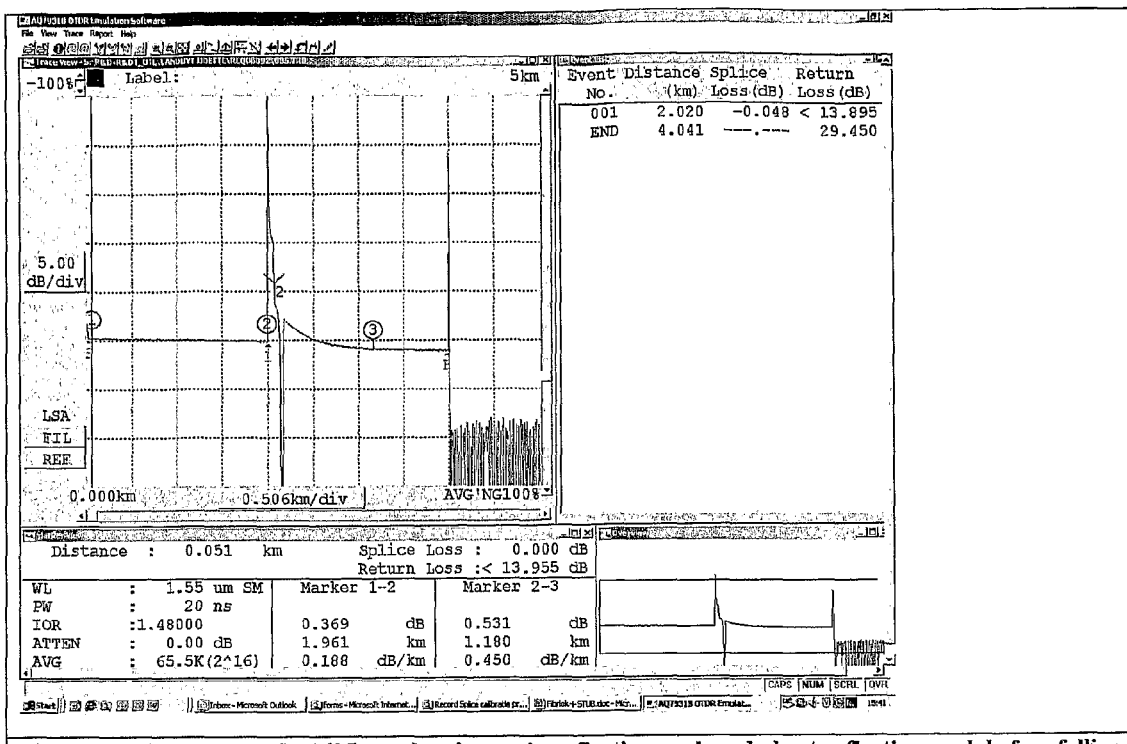
Fig. 2.a.: OTDR trace at l= 1625 nm showing main reflection peak and ghost reflection peak before falling into the noise level (receiver gets into saturation after detecting the main reflection)
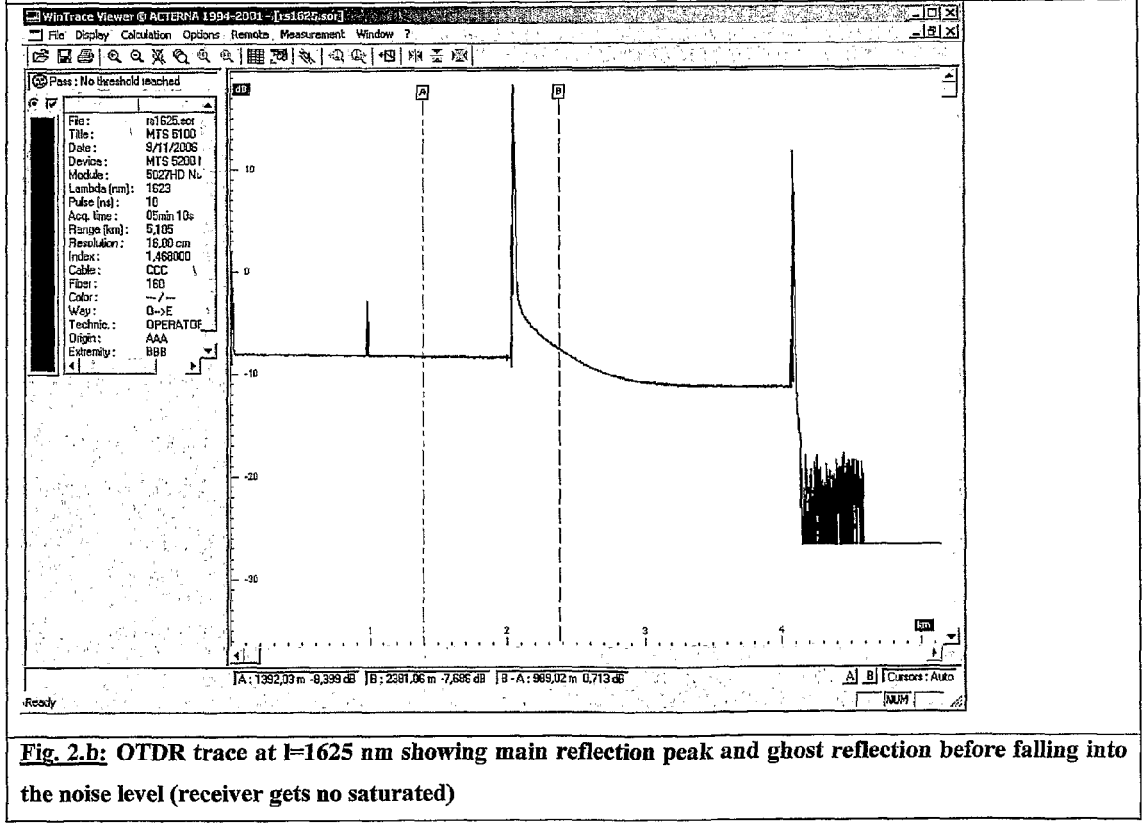
Fig. 2.b: OTDR trace at l=1625 nm showing main reflection peak and ghost reflection before falling into the noise level (receiver gets no saturated)

OPTICAL CABLE TESTING

BACKGROUND OF THE INVENTION

This invention relates to apparatus and methods for testing the optical signal quality of an optical fibre, for example in a telecommunications optical drop cable before it is connected to subscriber apparatus.

Fiber monitoring methods today are well established to allow for testing of a fiber optic link. This can be done using various kinds of optical time domain reflectometer set-ups (OTDR) and this has been widely adopted in checking the quality of long distance fiber links. For FTTH (fiber to the home) deployments, however, there is a growing need for low-cost monitoring methods to check the quality of a short distance link in a highly branched network. More specifically, a low cost method is still lacking for checking the quality of drop cable deployment, i.e. a predefined connected cable that is laid by a first installation crew from a terminal up to a certain point that is not yet connected to the optical network terminal (ONT). The drop point will most likely be a multi-dwelling unit (MDU) e.g. an apartment building, where generally a group of ONT's is located, but single or other subscriber connection boxes are not excluded. Upon subscriber demand for a connection, a second crew must visit to make the connection from the ONT in the subscriber's residence to the drop cable in the MDU. Ideally, a check for correct installation of the drop cable should be available to the subscriber connection crew to confirm that the drop cable link is still free of faults before starting to connect the subscriber, especially in an MDU.

SUMMARY OF THE INVENTION

The test method according to the present invention addresses this lack of a convenient low-cost drop cable test, and in principle comprises placing the end of the optical fibre to be tested in a fibre-holding device, preferably of the general kind described in WO2005/052665, although other forms of fibre-holding device may readily be devised by persons familiar with this field of technology. The fibre-holding device holds the fibre end in alignment with a suitable reflective body to reflect an optical signal arriving from the exchange back towards the exchange where it can be detected by a suitable instrument, preferably an optical time domain reflectometer (OTDR), to confirm acceptable signalling quality of the optical path between the exchange and the fibre end. This test will normally be conducted by the installing technician, in order to ensure that the drop cable has been properly installed and is capable of delivering an acceptable signal quality, before the drop fibre is connected to the subscriber equipment, for example in a multi-dwelling unit such as a block of apartments or flats. Confirmation of the drop connection quality in this way avoids time-wasting confusion in cases where the subscriber equipment is connected but fails to function.

The reflective body is preferably a stub of optical fibre held, preferably pre-installed, in the fibre-holding device for end-to-end alignment with the drop fibre end. The aligned ends of the fibres may be angled or straight. The stub fibre may provide the necessary reflection in various ways, for example by means of a metal coating or refraction grating on its remote end. Alternatively, the signal reflection may be provided by placing the fibre end on or in a body of gel or similar material having a refractive index substantially different from that of the fibre, preferably with the gel (etc) in a fibre holder of a aforementioned kind.

A preferred feature of the invention provides a fibre holder with the fibre stub (or the gel or similar material) pre-installed in it, ready for insertion into the holder of the end of the drop cable fibre to be tested. Such fibre holders with the pre-installed stub or gel (etc) may themselves be pre-installed ready for use in each subscriber connection box or cabinet in a given dwelling and/or may be carried by the installing technician. An advantageous possibility may be to use the same fibre holder both for the drop fibre test and, after removal of the stub fibre or gel (etc), for the subsequent connection of the drop fibre to the subscriber equipment.

Further features of this invention may be understood from the following description, which includes some specific examples and is illustrated by the accompanying schematic drawings.

BRIEF DESCRIPTION OF THE DRAWINGS

FIGS. 2a and 2b show that for some OTDR's the receiver can go into saturation while for others not. Note that the second peak arises at twice the travelling distance of the main reflection. This provides a unique recognizable signature to find out that the OTDR test pulse has reached the reflector device.

DETAILED DESCRIPTION

The method according to the present invention preferably makes use of a mechanical splice product as described in WO-A-2005052665, which provides an optical fibre connector for forming a mechanical splice between first and second bare optical fibres stripped of coatings, the connector comprising a connector body that comprises at least two main clamping sections dimensioned to clamp directly onto the bare fibre of the first and second optical fibres, the main clamping sections arranged such that the first optical fibre may be clamped by a first of the main clamping sections independently of the second optical fibre, enabling the clamping of the first fibre against rotational and axial movement with respect to the connector body to remain substantially undisturbed by subsequent clamping or unclamping of the second fibre. By "bare optical fibres stripped of coatings" is generally meant that end portions of the fibres to be spliced are stripped of coatings, or merely that the fibres (or at least their end portions) substantially lack coatings. The stripped coatings generally comprise primary coatings and/or buffer coatings.

Figure 4:
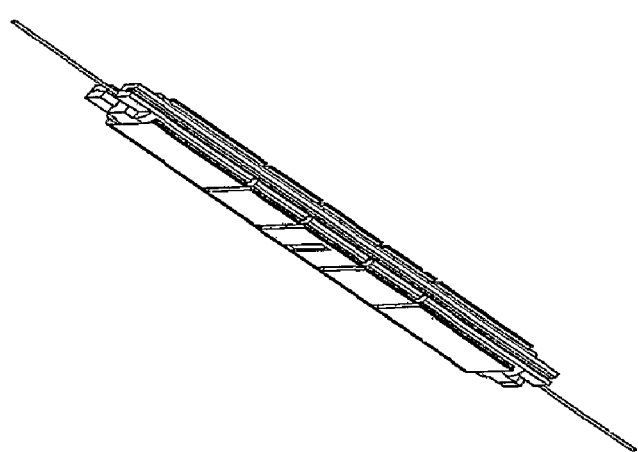
FIG. 4 shows in perspective a splice holder of the kind known from WO-A-2005052665 of Tyco Electronics Raychem Nev.

The mechanical splice products described and claimed in WO-A-2005052665, an example of which is shown in FIG. 4, provide optical fibre connectors that have major advantages over previously known connector systems, including: (i) "half-installability", i.e. the ability to install a first optical fibre (or a first set of optical fibres) in a mechanical splice connector, and to install a second optical fibre (or a second set of fibres) to be spliced with the first fibre(s) at a later time; (ii) the ability to close a "half-installed" mechanical splice connector such that the interior of the connector and the installed optical fibre(s) are protected, until the second optical fibre(s) is/are spliced; (iii) the ability to clamp the first optical fibre(s) against movement in the x, y, or z directions, and also against rotation, which enables the orientation of an angle-cleaved end face of the (or each) first fibre to be fixed for subsequent alignment with a second angle-cleaved fibre; (iv) the ability of a single mechanical splice connector to accommodate different diameters of optical fibre, for example both 250 μm diameter coated fibre and 900 μm diameter coated fibre; and (v) the versatility of a mechanical splice connector either not to include a means of precisely aligning the spliced optical fibres (where the numerical aperture of the fibres is such that no precise alignment is required), or to include any one of a variety of alignment means, to suit particular requirements.

Figure 1:
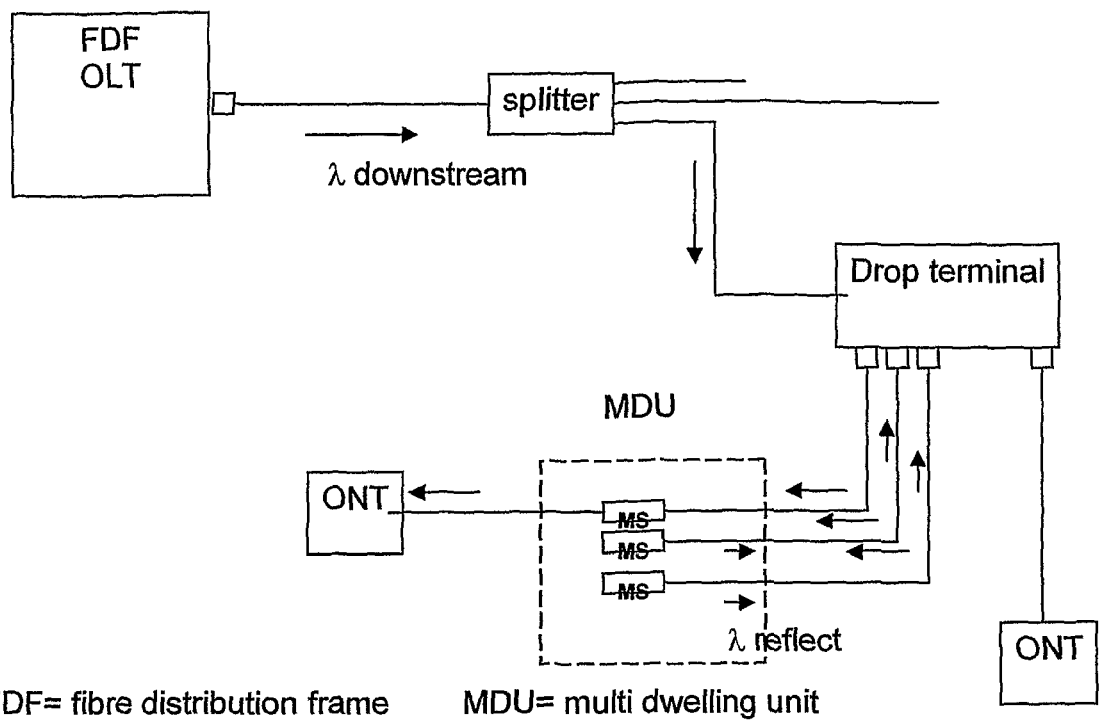
FIG. 1 shows connections to a multi-dwelling unit, to which the present test method may be applied.

The ability to install fibres in the splice products of WO-A-2005052665 in two stages is exploited for monitoring purposes according to the present invention. This is illustrated in FIG. 1 specifically for a split passive optical network (PON) scenario. In the central office a fiber cable is deployed from optical line terminal OLT, positioned as known per se in a fiber distribution frame FDF, towards a splitter cabinet where it is spliced to a splitter device. From the splitter cabinet the fibers are routed to a drop terminal where a drop cable is connected and is laid up to a multi dwelling unit MDU.

Figure 2:
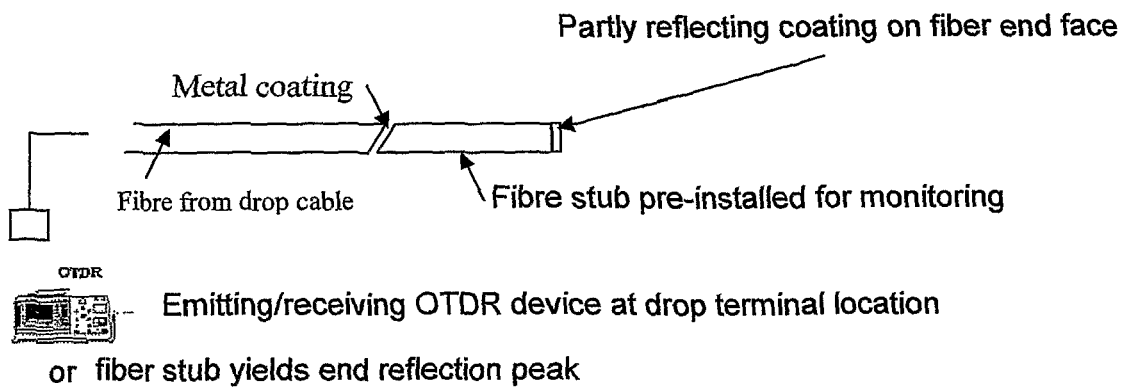
FIG. 2 shows one way of drop fibre testing according to the present invention; the typical OTDR signature as can be measured with different OTDR meters is shown and explained. The typical OTDR trace shows a main reflection signature originating from the metal coated surface and a ghost reflection, arising from back scattering of the first reflected OTDR pulse, which back scattering is reflected a second time by the coated stub reflector.

In the MDU, the drop cable fiber is inserted into one ("front") end of a mechanical splice product of the aforementioned kind having a short fiber stub piece pre-installed into its other ("rear") end. Possible ways to prepare such a half-installed mechanical splice for monitoring purposes according to the present invention include:

1) Insert a piece of angle-cleaved (or straight-cleaved) fiber having a metal-coated cleaved end, as shown in FIG. 2, into the rear of the mechanical splice product, for example of the kind known per se illustrated in FIG. 4. When installing the drop cable, its optical fiber will be stripped and cleaved at an angle (or straight) and inserted into the mechanical splice product in such a way that it abuts the metal-coated end of the stub fiber. This will give a quite substantial reflection that can be easily detected by an OTDR or by a peak power generating device that also allows to detect the reflected peak, see in FIG. 2.a and FIG. 2.b.

2) In some cases however it is necessary to obtain a high return loss for the device in a parking lot. In order to still keep a high return loss and to allow for monitoring, the aforementioned metal coating can be omitted and the fiber can be coated instead at its distal end with a partly reflecting coating material generating a high reflection selectively at the monitoring wavelength, for example 1625 nm, as shown alternatively in FIG. 2. In that case the downstream signal traffic band at 1550 nm is unaltered, while the 1625 nm band is reflected for monitoring. The same can be accomplished by writing a Bragg grating structure in the distal end of the fiber stub in the rear of the mechanical splice product. The grating can be designed to reflect only a dedicated wavelength window. One could think of mechanically straining the grating to alter its reflection characteristic in response to a movement or event that has to be remotely detected. This may also be beneficial in applications other than telecommunications.

Figure 3:
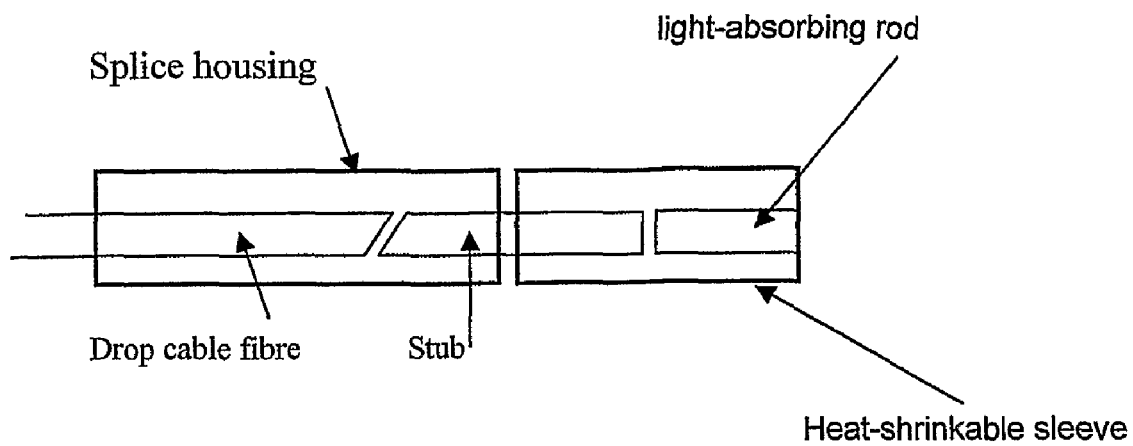
FIG. 3 shows another way of drop fibre testing according to the present invention.

3) When only a modest end reflection of the fiber stub is sufficient to allow for monitoring, the fiber stub may be terminated in the way illustrated in FIG. 3. For this case the stub fiber is cleaved at one end at an angle of 8° to make a keyed connection to the angle-cleaved fiber of the drop cable. The distal end of the stub is cleaved perpendicularly to generate a reflection of 14.6 dB and can be metal coated (not shown), or can be butted as shown against a rod absorbing the light leaving the fiber. An opaque or light-absorbing protective sleeve can be heat-shrunk around the stub and the rod to unify them for convenient handling and to avoid eye damage to the installers at the MDU side when a monitoring light beam is transmitted from the central office side to test the drop cable connection.

4) Finally, one could also think of inserting a straight-cleaved drop cable fibre into a splice or other support filled with a gel or other compliant material having a refractive index substantially different from the refractive index of the core of the fiber. This will also give a big reflection for monitoring, but the test results may be less reliable and consistent than those achieved by the preferred use of a pre-installed fiber stub, which may be factory-installed in the test splice product.

The invention claimed is:

1. Method for testing the optical fiber connection quality of an optical drop fiber between a telecommunications system and a subscriber connection box in a multi-dwelling unit or other subscriber premises before connection to other subscriber equipment comprising the following steps:
providing a fiber holding device having at least two main clamping sections arranged by a first of the main clamping sections independently operable from a second of the main clamping sections, the first main clamping section being undisturbed by subsequent clamping or unclamping of the second main clamping section;
inserting a reflection-producing body in the first of the main clamping sections;
placing the end of the optical drop fiber to be tested in the second main clamping section of the fiber-holding device, which holds the fiber end in alignment with the reflection-producing body;
providing an optical signal from a direction of the telecommunications system which is reflected by the said reflection-producing body back towards the telecommunications system; and
detecting the reflected signal by an instrument to confirm acceptable signalling quality of the optical path between the telecommunications system and the drop fiber end.

2. Method according to claim 1, wherein the reflection-producing body is a stub of optical fiber held, pre-installed, in the fiber-holding device for end-to-end alignment with the fiber to be tested.

3. Method according to claim 2, wherein the stub fiber provides the reflection by means of a metal coating or refraction grating on its distal end.

4. Method according to claim 1, wherein the signal reflection is provided by placing the drop fiber end on or in a reflection-producing body of gel or other compliant material having a refractive index substantially different from that of the fiber, with the gel in a fiber holding device of the aforementioned kind.

5. Method according to claim 1, wherein the said reflection-producing body is selected and arranged so that the signal reflection can be altered by mechanical distortion or other changes in the environment of the reflection-producing body.

6. Method according to claim 1, wherein the same fiber holder is used both for the fiber test and, after removal of the stub fiber or gel, for the subsequent connection of the tested fiber to the subscriber equipment.

7. Method according to claim 1, wherein the said fiber holding device and/or the said reflective body is or are provided by the installer at the time of the test.

8. Method according to claim 1, wherein the said fiber holding device or the said reflective body is or are pre-installed in the subscriber connection box.

9. Method according to claim 1, wherein the detection is accomplished by an optical time domain reflectometer (OTDR).

10. A fiber holder for use in the method according to claim 1, having the fiber stub pre-installed in it, ready for insertion into the holder of the end of the optical fiber to be tested.

11. A fiber holder according to claim 10 pre-installed in a subscriber connection box or cabinet situated, or to be situated, at or in a dwelling.

* * * * *